(12) United States Patent
Tietze et al.

(10) Patent No.: US 9,482,205 B2
(45) Date of Patent: Nov. 1, 2016

(54) WIND TURBINE HAVING A HEAT TRANSFER SYSTEM

(75) Inventors: Poul Torben Tietze, Brabrand (DK); Jesper Nyvad, Egå (DK); Jacob Hviid Nielsen, Tjele (DK); Jesper Lykkegaard Neubauer, Hornslet (DK); Carsten Roed, Bjerringbro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 835 days.

(21) Appl. No.: 13/819,251

(22) PCT Filed: Aug. 17, 2011

(86) PCT No.: PCT/DK2011/050312
§ 371 (c)(1),
(2), (4) Date: May 23, 2013

(87) PCT Pub. No.: WO2012/028145
PCT Pub. Date: Mar. 8, 2012

(65) Prior Publication Data
US 2013/0236308 A1 Sep. 12, 2013

Related U.S. Application Data

(60) Provisional application No. 61/378,574, filed on Aug. 31, 2010.

(30) Foreign Application Priority Data

Aug. 31, 2010 (DK) .................................. 201070379

(51) Int. Cl.
*F03D 7/02* (2006.01)

(52) U.S. Cl.
CPC .............. *F03D 7/026* (2013.01); *F03D 80/40* (2016.05); *F03D 80/70* (2016.05); *F05B 2260/20* (2013.01); *Y02E 10/722* (2013.01); *Y02E 10/723* (2013.01)

(58) Field of Classification Search
CPC .. F03D 7/026; F03D 7/0224; F03D 11/0008; F03D 11/0025; F05B 2260/20

USPC .......................................................... 416/39
See application file for complete search history.

(56) References Cited

U.S. PATENT DOCUMENTS 6,774,504 B1 *  8/2004  Lagerwey ............... F03D 9/002
                                                       290/44
7,161,259 B2 *  1/2007  Lagerwey ............... F03D 9/002
                                                       290/44

(Continued)

FOREIGN PATENT DOCUMENTS

DE     102007054215 A1    5/2009
DE     102008057455 A1    5/2010

(Continued)

OTHER PUBLICATIONS

Danish Patent and Trademark Office, Search Report issued in corresponding Danish Patent Application No. PA201070379 dated Apr. 14, 2011, 5 pages.

(Continued)

*Primary Examiner* — Dwayne J White
*Assistant Examiner* — Julian Getachew
(74) *Attorney, Agent, or Firm* — Wood Herron & Evans LLP

(57) ABSTRACT

A method of starting up a wind turbine includes heating first and second components, the first component having a first minimum operating temperature and the second component having a second minimum operating temperature. Excess heat is generated after the second component has been heated to the second minimum operating temperature. The excess heat is transferred to the first component to assist heating the first component to the first minimum operating temperature. The first and second components are cooled after reaching the first and second minimum operating temperatures.

14 Claims, 6 Drawing Sheets

(56) References Cited

U.S. PATENT DOCUMENTS

| | | | |
|---|---|---|---|
| 7,658,594 B2* | 2/2010 | Christensen | F03B 3/00 |
| | | | 416/156 |
| 2008/0298964 A1* | 12/2008 | Rimmen | F03D 9/002 |
| | | | 416/39 |
| 2009/0200114 A1* | 8/2009 | Bagepalli | F03D 11/0008 |
| | | | 184/6.22 |
| 2009/0212575 A1* | 8/2009 | Larsen | F03D 9/00 |
| | | | 290/55 |
| 2010/0034653 A1 | 2/2010 | Frokjaer | |

FOREIGN PATENT DOCUMENTS

| | | |
|---|---|---|
| EP | 2007184 A2 | 12/2008 |
| WO | 2008092449 A2 | 8/2008 |

OTHER PUBLICATIONS

European Patent Office, Search Report issued in corresponding PCT/DK2011/050312 dated Nov. 22, 2011, 4 pages.

* cited by examiner

WIND TURBINE HAVING A HEAT TRANSFER SYSTEM

TECHNICAL FIELD OF THE INVENTION

The present invention relates to a method of starting up a wind turbine having first and second components with first and second minimum operating temperatures.

BACKGROUND ART

When a wind turbine is non-operable for a period of time, for instance during installation or maintenance/service, or when the wind turbine is stopped for other reasons, e.g. high winds or extreme weather conditions, the different wind turbine components, such as the gearbox, generator, hydraulic system, transformer, etc. are cooled down.

Many wind turbine components use oil or other liquids as working fluids or need to be lubricated to function effectively. When the wind turbine is out of operation, the lubrication and working fluids become viscous or thick and thereby unable to flow through the components.

During the start-up of a cold wind turbine, it therefore becomes necessary to heat up the different components to a minimum temperature to make the wind turbine operable and able to produce energy.

Since some wind turbine components are quite big in relation to their weight it may take a very long time to heat them up, which prolongs the start-up procedure of the wind turbine.

Thus, there is a need for at solution which minimises the time required to heat up one or more components in a wind turbine, especially in cold weather conditions, to make the wind turbine operable faster.

SUMMARY OF THE INVENTION

It is an object of the present invention to wholly or partly overcome the above disadvantages and drawbacks of the prior art and provide a wind turbine for which a start-up procedure may be performed rapidly.

Furthermore, it is an object of the present invention to provide a wind turbine which allows for faster heating of the different components, especially in cold weather conditions.

The above objects, together with numerous other objects, advantages, and features which will become evident from the below description, are accomplished by a solution in accordance with the present invention, by a method of starting up wind turbine comprising: (a) heating a first component, the first component having a first minimum operating temperature; (b) heating a second component, the second component having a second minimum operating temperature, and wherein heat loss is generated after the second component has been heated to the second minimum operating temperature; (c) transferring heat loss from the second component to the first component to assist heating the first component to the first minimum operating temperature; and (d) cooling the first and second components after reaching the first and second minimum operating temperatures.

As can be appreciated, the second component assists in heating up the first component, whereby the heating up of both components may be shortened, thereby also reducing the overall time it takes for the entire wind turbine to become operable and ready for production.

The term "component" is in this context to be construed as a component vital for the operation of the wind turbine. If the component in question is not functioning or present in the wind turbine, the wind turbine is not operable.

In one embodiment, heat loss from the second component is transferred to the first component by circulating heat transfer medium between the first and second components. The heat transfer medium may be, for example: glycol, water, oil, or a combination thereof. Furthermore, the first and second components may be cooled by circulating heat transfer medium between the first and second components and a cooling device. The heat transfer medium and cooling device form part of a heat transfer system.

In a further aspect or embodiment, a control device may be arranged in the heat transfer system to secure that heat loss from the second component is not transferred to the heat transfer system until the second component reaches the second minimum operating temperature. In this way, it is secured that the second component is heated to the point where it is operable.

Furthermore, the second minimum operating temperature may be between −30° C. and 30° C., preferably between −20° C. and 10° C.

In yet another aspect or embodiment, the first component includes a first circulating fluid. Heat loss is transferred from the second component to the first component by transferring heat between the first circulating fluid and the heat transfer medium. For example, the first component may include a heat exchanger through which the heat transfer medium is passed to transfer heat. The second component may include a second circulating fluid such that heat transfer occurs in a similar manner (e.g., by passing the heat transfer medium through a heat exchanger in the second component or otherwise).

Moreover, the first component may be a gearbox with lubricant serving as the first circulating fluid. The gearbox is a vital component in a wind turbine, and the wind turbine may not function properly and be operable until the temperature of the gearbox or the lubrication of the gearbox reaches a predetermined minimum temperature. Since the gearbox has a considerable size and volume, it takes a long time for it to heat up during the start-up procedure.

Furthermore, the gearbox may be a dry sump gearbox or a wet sump gearbox, or a combination thereof. Also, a lubrication reservoir may be arranged in connection with the gearbox.

Additionally, the second component may be a hydraulic system with a working fluid serving as the second circulating fluid. The hydraulic system is also a vital component in the wind turbine during operation, however, for the hydraulic system to reach its predetermined minimum temperature takes shorter time than for instance the gearbox. Therefore, it is advantageous that the hydraulic system assists in heating up another component, for instance the gearbox or other components which take longer to heat up than the hydraulic system.

BRIEF DESCRIPTION OF THE DRAWINGS

The invention and its many advantages will be described in more detail below with reference to the accompanying schematic drawings which, for the purpose of illustration, show some non-limiting embodiments, and in which.

All the drawings are schematic and not necessarily to scale, and they show only those parts which are necessary in order to elucidate the invention, other parts being omitted or merely suggested.

DESCRIPTION OF PREFERRED EMBODIMENTS

Figure 1:
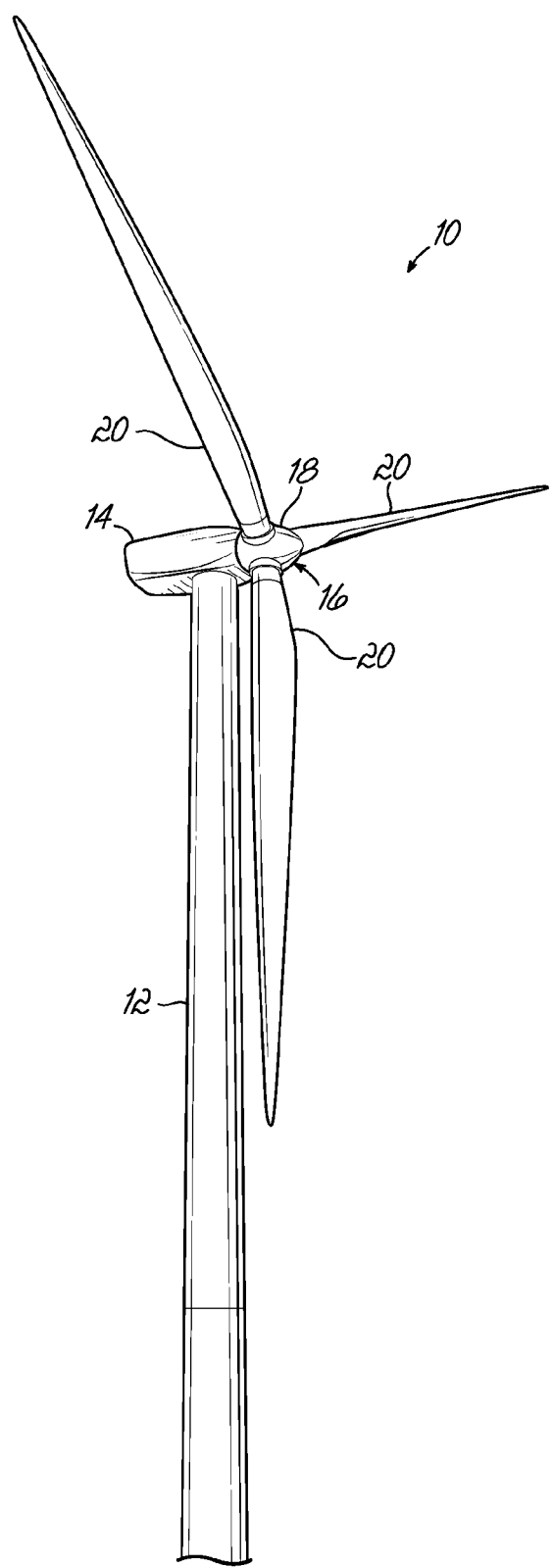
FIG. 1 shows a schematic view of a wind turbine.
Figure 2:
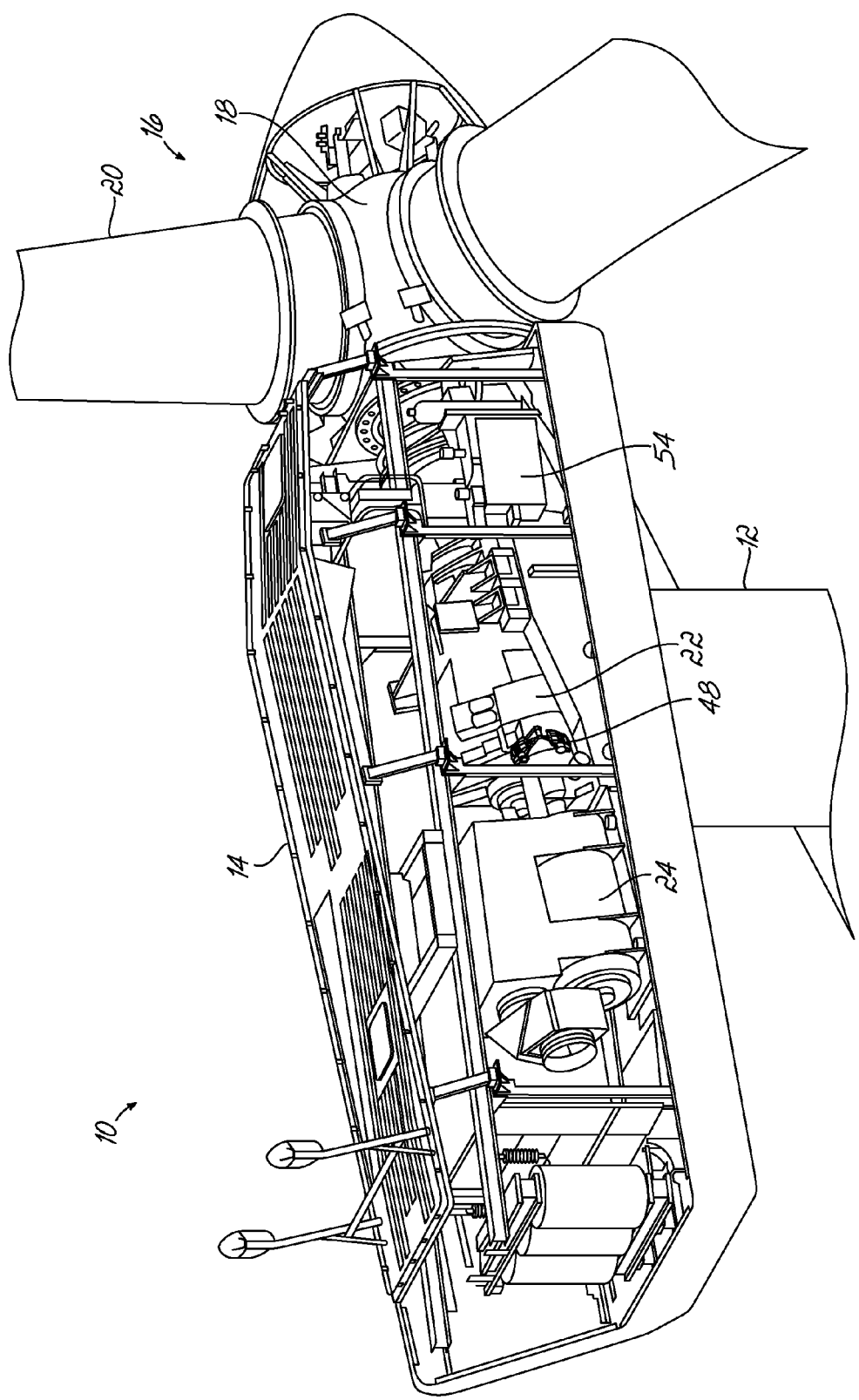
FIG. 2 shows a perspective view of an example of a wind turbine with portions cut away to show the internal components of the wind turbine.

FIGS. 1 and 2 show one embodiment of a wind turbine 10. The wind turbine generally comprises a tower 12, a nacelle 14 supported by the tower 12, and a rotor 16 attached to the nacelle 14. The rotor 16 includes a hub 18 rotatably mounted to the nacelle 14 and a set of blades 20 coupled to the hub 18. The blades 20 convert the kinetic energy of the wind into mechanical energy. The nacelle 14 houses wind turbine components used to convert the mechanical energy into electricity. For example, the mechanical energy is typically transferred by a drive train 22 to a generator 24 that produces the electricity.

These and other wind turbine components in the nacelle 14 generate heat during this process. To this end, as used herein, the term "wind turbine component" (or first component, second component, etc.) refers to heat-generating components in the nacelle 14, such as the generator, the gear system, gearbox, transformer(s), converter(s), pump(s), lubrication system(s), bearing(s), hydraulic system(s), and the like.

Figure 3:
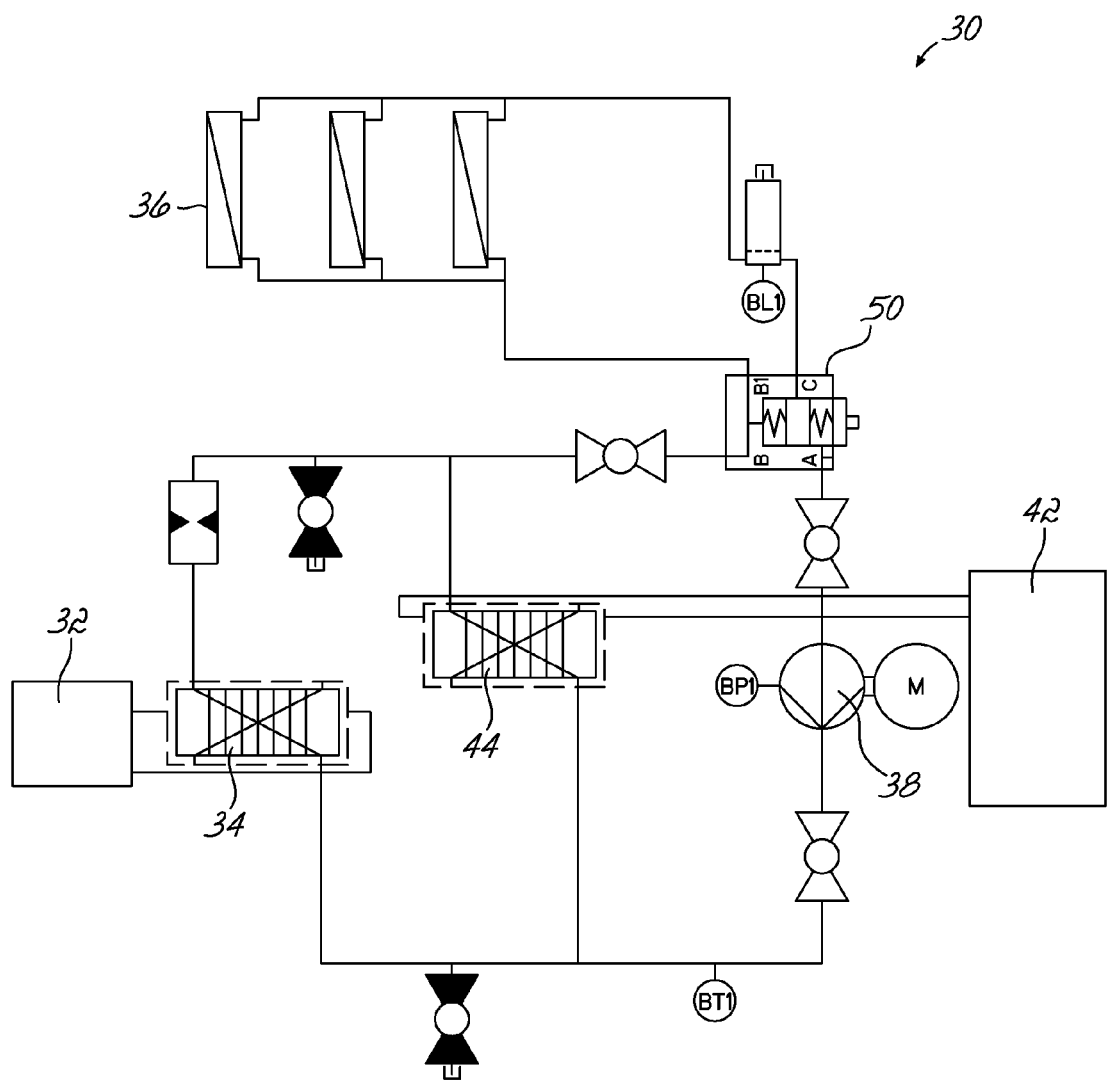
FIG. 3 shows a diagram of a heat transfer system according to the invention.

The wind turbine components are typically connected to one or more heat transfer systems for controlling their operating temperatures. FIG. 3 illustrates a heat transfer system 30 according to one embodiment. As will be described in greater detail below, the heat transfer system 30 is adapted to cool a first component 32 during operation by circulating a heat transfer medium through a heat exchanger 34, whereby heat is transferred between for instance a lubrication oil of the first component 32 to the heat transfer medium. The heat transfer medium is in this embodiment cooled by means of a cooling device 36, for instance a free-wind cooler, placed on top of the nacelle. The wind cools the heat transfer medium as it passes through the fluid circuit associated with the cooling device 36 in such an embodiment. A pump 38 for circulating the heat transfer medium is also provided in the heat transfer system 30.

A second component 42 is also connected to the heat transfer system 30. The heat transfer system 30 is also configured to cool the second component 42 during normal operation of the wind turbine. The transfer of heat between the second component 42 and the heat transfer system 30 may be performed by means of a second heat exchanger 44.

During the start-up procedure of the wind turbine and the different components, each component has heating elements or other means for gently heating up the component, and thus, each component is able to heat itself up to a minimum operating temperature over a period of time. However, since some components take longer time to heat up than others, it is desirable to minimise the time it takes to heat up all the components to make the wind turbine operable, and thereby energy producing, faster.

In the embodiment shown, the first and second components 32, 42 are heated up by their separate heating elements (not shown). When the second component 42 reaches a predetermined temperature, the continuing heat loss from the second component 42 is transferred to the heat transfer system 30 so that the heat loss from the second component 42 assists in heating up the first component 32, thereby minimising the total period of time spent on heating up the first component 32. A control device 50, such as a control valve, may be provided in the heat transfer system 30 to ensure that the heat transfer medium bypasses the cooling device 36 during the start-up procedure. As a result, the heat transfer medium is only circulated between the first and second components 32, 42.

More specifically, the second component 42 transfers its heat loss, and thereby heat, to the second heat exchanger 44. The heat transfer medium circulating in the heat transfer system 30 is then heated in the heat exchanger 44, after which the heated heat transfer medium is directed to the first heat exchanger 34. The heated heat transfer medium does not flow to the cooling device 36 because the control device 50 is closed during this step. In the first heat exchanger 34, the heat transfer medium transfers heat to the first component 32, whereby the first component 32 is heated up faster. The cooling device 36 is advantageously bypassed again during this start-up procedure, whereby the heat transfer medium is led directly from the first heat exchanger 34 to the second heat exchanger 44 for additional heating. This procedure is continued at least until the first component 32 reaches its minimum operating temperature, after which the heat transfer system 30 operates as a normal cooling system again. That is, the control device 50 is opened to allow the heat transfer medium to circulate between the first and second components 32, 42 and cooling device 36.

In one aspect of the invention, the first component 32 may for instance be a gearbox and the second component 42 a hydraulic system, which will be described further below.

Furthermore, the gearbox may be a dry sump gearbox or a wet sump gearbox, or a combination thereof. In connection with the gearbox, a lubrication reservoir may be arranged for containing the lubrication to be used in connection with the operation of the gearbox. In one embodiment, the lubrication may not be led into the gearbox until the lubrication contained in the lubrication reservoir reaches a predetermined temperature. In this embodiment, the gearbox may primarily be heated up by heating the lubrication contained in the lubrication reservoir or tank.

The hydraulic system may be any of several hydraulically-based systems relating to different aspects of the wind turbine's operation. For example, the wind turbine 10 (FIGS. 1 and 2) may include a pitch system (not shown) having one or more hydraulic cylinders for rotating the blades 20 around their respective axes. Additionally, the wind turbine 10 may include a brake system 48 having one or more hydraulically-actuated calipers for applying friction to a disc. The disc is coupled to the drive train so that the calipers can bring the rotor to a standstill and/or maintain the wind turbine 10 in a "parked" (i.e., stopped) position when actuated.

To supply working fluid (e.g. pressurised oil) to these systems, the wind turbine 10 may be further provided with a hydraulic station 54. The hydraulic station 54 and hydraulically-based systems it serves may be part of a larger hydraulic system. More specifically, the pitch system and brake system may be subsystems within a common hydraulic system. They are considered "consumer systems" because they place demands on the hydraulic station 54 for the working fluid. To meet these demands, the hydraulic station 54 includes components designed to perform various functions, such as pressure control and filtration.

Figure 4:
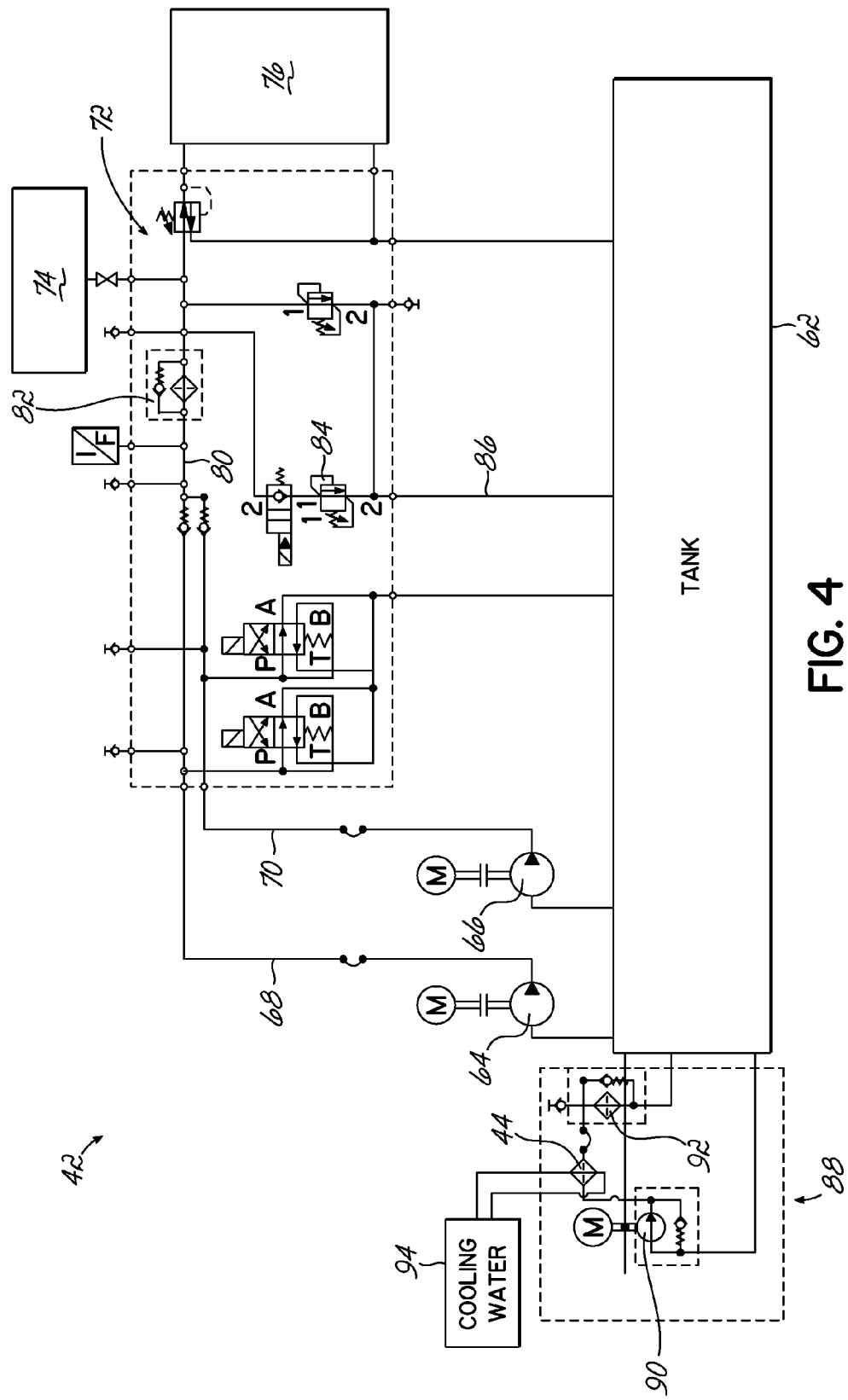
FIG. 4 shows a hydraulic diagram of one embodiment of a hydraulic station.
Figure 5:
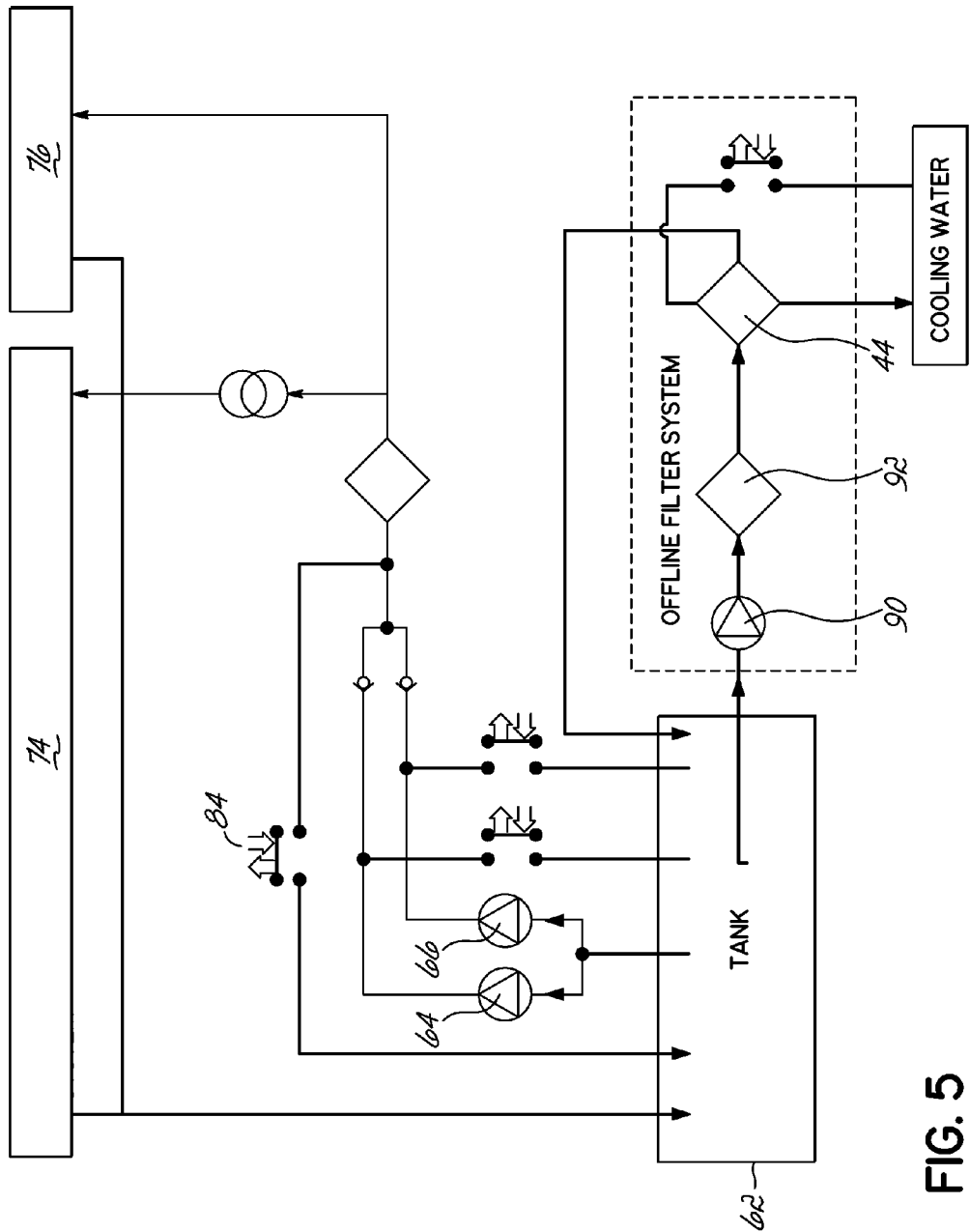
FIG. 5 shows a schematic view of the hydraulic station represented in FIG. 4.

FIGS. 4 and 5 illustrate one embodiment of the hydraulic system described above, with FIG. 4 being a hydraulic diagram and FIG. 5 being a schematic view of the hydraulic diagram. In this embodiment, the hydraulic system (i.e., second component) 42 comprises a tank or reservoir 62 for storing the working fluid and first and second pumps 64, 66 fluidly connected to the tank 62. First and second flow paths 68, 70 extend from the respective first and second pumps 64, 68 to a hydraulic circuit 72 which feeds the working fluid to a pitch system 74 and/or brake system 76.

Furthermore, the hydraulic circuit 72 may comprise a main supply line 80 fed by the first and second flow paths 68, 70, a high pressure filter 82 located in the main supply line 80, and a heating valve 84 communicating with the main supply line 80. In the embodiment shown, the heating valve 84 is a relief valve located in a return line 86 communicating working fluid from the main supply line 80 back to the tank 62. The heating valve 84 creates a pressure drop, and this released energy is used to heat the working fluid.

Advantageously, however, an offline filter system 88 of the hydraulic system 42 remains isolated from the first and second pumps 64, 66, first and second flow paths, and hydraulic circuit 72. The offline filter system 88 is only in fluid communication with the tank 62, which is why it is considered an "offline" system. In the offline filter system 88, an offline pump 90 pulls working fluid from the tank 62 and delivers it to a filter 92 fluidly connected to the pump 90. After passing through the filter 92, the working fluid may then pass through the heat exchanger 44 before returning to the tank 62. A supply of heat transfer medium 94 is fluidly connected to the heat exchanger 44 so that the working fluid can be conditioned to a desired temperature, as explained above.

During the start-up procedure of the hydraulic system, i.e. the second component 42, the working fluid temperature of the hydraulic system must be over a minimum level. Thus, the working fluid must be heated. This is firstly performed by using the motor of the offline pump 90, and later, as the temperature increases, by using the motors of the high pressure pumps 64, 66 together with relief valves and the heating valve 84. In order to heat up the pitch system 74, a flush sequence is running in the time period when the oil is heated by using the high pressure pumps 64, 66 and the heating valve 24. When the temperature reaches the minimum level, for instance around −10° C., the subsequent heat loss in the hydraulic system is transferred to the heat exchanger 44, and from there on to the first component 32, i.e. the gearbox, via the heat transfer system 30. Consequently, the heat loss from the hydraulic system assists in heating up the gearbox.

For instance, the working fluid of the hydraulic system may be heated from −30° C. to −10° C. in approximately 4½ hours, which is a considerably shorter period of time than that spent on heating up the gearbox within the same temperature interval. Thus, the hydraulic system advantageously assists in heating up the gearbox when the hydraulic system reaches a minimum level, whereby the overall process of heating of all the components of the wind turbine is shortened. This furthermore shortens the start-up procedure, causing the wind turbine to become operable faster than known wind turbines.

In another embodiment, the hydraulic system may comprise a security device (not shown) enabling the wind turbine to always be able to pitch during the start-up procedure. In the embodiment shown in FIGS. 4 and 5, the hydraulic system comprises first and second pumps 64, 66. One of these pumps may be allocated to continuing pressurising the working fluid so that the hydraulic system, and thereby the pitch system for the rotor blades, may function. In the meantime, the other pump may assist in additionally heating up the working fluid, which then may be transferred to the first component 32, for instance the gearbox, as mentioned in the embodiment described above. In another embodiment where the hydraulic system only comprises one pump, the security device secures that the working fluid is always pressurised enough for the pitch system to function.

Figure 6:
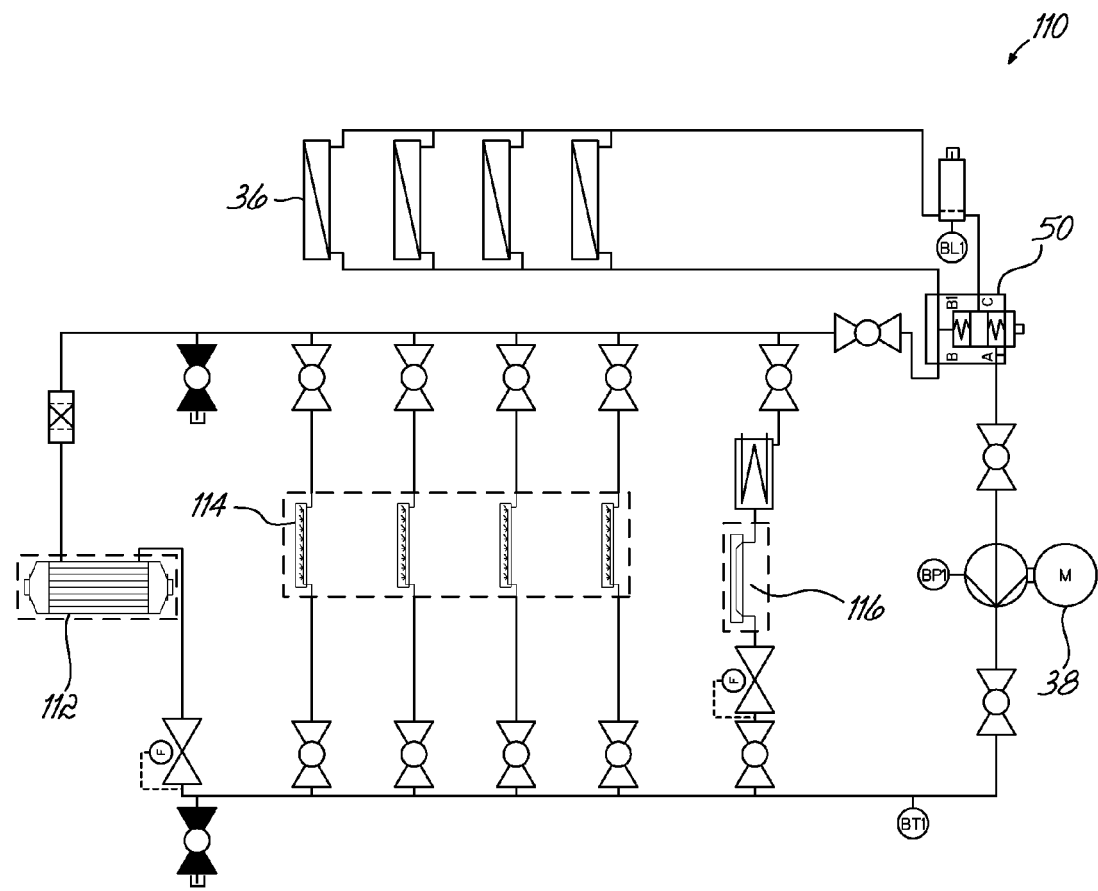
FIG. 6 shows another diagram of an additional heat transfer system.

FIG. 6 shows an additional heat transfer system 110, with like reference numbers being used to refer to like structure. This heat transfer system 110 is configured to cool first and second components 112, 114 during operation of the wind turbine in substantially in the same manner as described in connection with the heat transfer system 30 above. Here, however, the first and second components 112, 114 represent a generator and a converter.

Additionally, the heat transfer system further includes a tank 116 having a heating element which is adapted to the heat up the heat transfer medium circulating in the heat transfer system 30. Thus, the heating element in the tank 116 may be used to heat up the first and second components 114, 116 during the start-up procedure of the wind turbine.

Furthermore, additional heating devices (not shown) may be included in the heat transfer systems 30, 110 or in connection with the components to promote the heating process of the individual components. These heating devices may be electrical heaters, heat pumps, heating wraps, heating maps, heating fans, or the like.

Even though the above mainly describes how the hydraulic system assists in heating up the gearbox, other components may be used to heat up yet other components, especially if the different components have different start-up procedures and thereby require longer or shorter time to heat up.

For instance the first component may be hydraulic pump directly connected to the main shaft of the wind turbine.

The present invention may as well be used in connection with a direct drive wind turbine.

Although the invention has been described in the above in connection with preferred embodiments of the invention, it will be evident for a person skilled in the art that several modifications are conceivable without departing from the invention as defined by the following claims.

The invention claimed is:

1. A method of starting up a wind turbine, comprising:
   heating a first component, the first component having a first minimum operating temperature;
   heating a second component, the second component having a second minimum operating temperature, and wherein excess heat is generated after the second component has been heated to the second minimum operating temperature;
   transferring the excess heat from the second component to the first component to assist heating the first component to the first minimum operating temperature; and
   cooling the first and second components after reaching the first and second minimum operating temperatures and during operation of the wind turbine when the first and second components generate heat.

2. The method according to claim 1, wherein transferring the excess heat from the second component to the first component comprises:
   circulating heat transfer medium between the first and second components.

3. The method according to claim 2, wherein cooling the first and second components comprises:

circulating the heat transfer medium between the first and second components and a cooling device.

4. The method according to claim 3, wherein the heat transfer medium is glycol, water, oil, or a combination thereof.

5. The method according to claim 3, wherein the first component includes a first circulating fluid, and wherein transferring the excess heat from the second component to the first component further comprises:
  transferring heat between the first circulating fluid and the heat transfer medium.

6. The method according to claim 4, wherein the first component includes a heat exchanger, and wherein the heat transfer medium is passed through the heat exchanger to transfer heat.

7. The method according to claim 6, wherein the first component is a gearbox, the first component includes a first circulating fluid, and the first circulating fluid is a lubricant.

8. The method according to claim 2, wherein the second component includes a second circulating fluid, and wherein transferring the excess heat from the second component to the first component further comprises:
  transferring heat between the second circulating fluid and the heat transfer medium.

9. The method according to claim 8, wherein the second component includes a heat exchanger, and wherein the heat transfer medium is passed through the heat exchanger to transfer heat.

10. The method according to claim 9, wherein the first component is a gearbox and the second component is a hydraulic system.

11. The method according to claim 10, wherein the hydraulic system includes one or more offline filter(s), pump(s), valve(s), or combinations thereof configured to generate heat in the second circulating fluid.

12. The method according to claim 10, further comprising:
  operating the hydraulic system to pitch blades of the wind turbine before the first component is heated to the first minimum operating temperature.

13. The method according to claim 1, wherein heating the first component or second component comprises operating one or more heating devices.

14. A method of starting up a wind turbine, comprising:
  providing a first component having a first minimum operating temperature and having a first heating element;
  heating the first component using the first heating element;
  providing a second component having a second minimum operating temperature and having a second heating element;
  heating the second component using the second heating element, wherein excess heat is generated after the second component has been heated to the second minimum operating temperature;
  transferring the excess heat from the second component to the first component to assist heating the first component to the first minimum operating temperature; and
  cooling the first and second components after reaching the first and second minimum operating temperatures and during operation of the wind turbine when the first and second components generate heat.

* * * * *